US010035686B2

(12) United States Patent
Kreischer

(10) Patent No.: US 10,035,686 B2
(45) Date of Patent: Jul. 31, 2018

(54) LIFTING DEVICE FOR AN ASSEMBLY OF A MOTOR VEHICLE

(71) Applicant: TKR Spezialwerkzeuge GmbH, Gevelsberg (DE)

(72) Inventor: Torsten Kreischer, Wetter (DE)

(73) Assignee: TKR Spezialwerkzeuge GmbH, Gevelsberg (DE)

( * ) Notice: Subject to any disclaimer, the term of this patent is extended or adjusted under 35 U.S.C. 154(b) by 122 days.

(21) Appl. No.: 14/957,281

(22) Filed: Dec. 2, 2015

(65) Prior Publication Data

US 2016/0152448 A1    Jun. 2, 2016

(30) Foreign Application Priority Data

Dec. 2, 2014   (DE) ................... 10 2014 117 703

(51) Int. Cl.
| | |
|---|---|
| *B66C 1/00* | (2006.01) |
| *B66C 1/10* | (2006.01) |
| *B25H 1/00* | (2006.01) |
| *B66C 1/42* | (2006.01) |
| *B66F 7/22* | (2006.01) |

(Continued)

(52) U.S. Cl.
CPC .............. *B66C 1/10* (2013.01); *B25H 1/0007* (2013.01); *B62D 65/022* (2013.01); *B66C 1/42* (2013.01); *B66F 7/22* (2013.01); *B66F 7/28* (2013.01)

(58) Field of Classification Search
CPC ........... B66C 1/10; B66C 1/42; B25H 1/0007; B62D 65/022; B66F 7/22; B66F 7/28

USPC ........................................................ 294/81.2
See application file for complete search history.

(56) References Cited

U.S. PATENT DOCUMENTS

| | | |
|---|---|---|
| 4,599,034 A | 7/1986 | Kennedy |
| 4,774,386 A | 9/1988 | Goodwin |

(Continued)

FOREIGN PATENT DOCUMENTS

| | | |
|---|---|---|
| DE | 38 22 228 C2 | 7/1991 |
| DE | 101 46 057 A1 | 4/2003 |

(Continued)

OTHER PUBLICATIONS

German Office Action dated Nov. 20, 2015 (English translation) (2 pages).

(Continued)

*Primary Examiner* — Gabriela M Puig
(74) *Attorney, Agent, or Firm* — Flaster/Greenberg P.C.

(57) ABSTRACT

A lifting device is provided for an assembly of a motor vehicle that can be adapted to lift various assemblies. The lifting device includes a load carrying unit having at least one support arm, and a coupling unit arranged on the support arm for releasably connecting the support arm to the assembly of a motor vehicle. The lifting device can be used as an engine hoist and/or a transmission hoist for removing and installing engines and/or transmissions and can be used to remove a wide range of assemblies, at least different engines and/or transmissions of different types of vehicles. The coupling unit is mounted on the support arm in a longitudinally movable manner. The load carrying unit is designed to be connected to a crane unit, and in particular has a crane hook holder, and/or is adjustably connected to a support unit arrangeable on a hoist unit.

19 Claims, 6 Drawing Sheets

Figure 1:
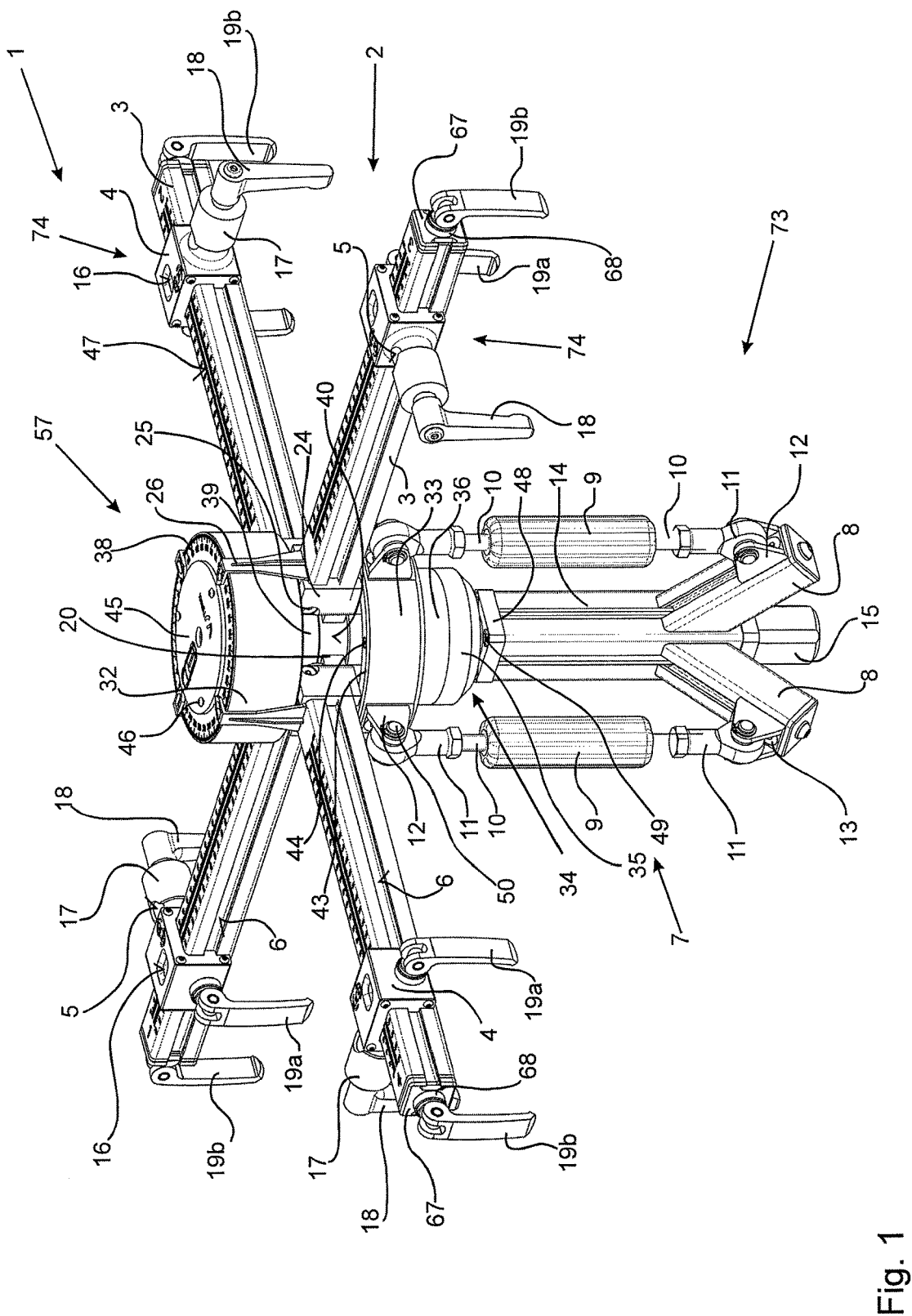

(51) Int. Cl.
*B66F 7/28* (2006.01)
*B62D 65/02* (2006.01)

(56) References Cited

U.S. PATENT DOCUMENTS

| | | | | |
|---|---|---|---|---|
| 4,792,129 | A * | 12/1988 | LePrevost, Jr. | B25B 5/10 |
| | | | | 269/156 |
| 5,131,257 | A * | 7/1992 | Mingardi | B21D 1/14 |
| | | | | 33/608 |
| 5,513,829 | A | 5/1996 | Hodges | |
| 6,533,260 | B1 * | 3/2003 | Mock | A61G 7/08 |
| | | | | 254/133 R |
| 7,296,787 | B2 | 11/2007 | Barrios et al. | |
| 8,226,140 | B1 | 7/2012 | Dietrich | |
| 8,235,334 | B1 | 8/2012 | Kobal | |
| 2007/0080549 | A1 * | 4/2007 | Jenney | B66C 1/10 |
| | | | | 294/81.3 |

FOREIGN PATENT DOCUMENTS

| | | |
|---|---|---|
| DE | 102010001519 A1 | 9/2011 |
| WO | WO 2011/095283 A1 | 8/2011 |

OTHER PUBLICATIONS

European Search Report dated Apr. 19, 2016 issued in European Application No. 15196493.9 having common priority (counterpart of pending U.S. Appl. No. 14/957,281) (English translation) (4 pages).

* cited by examiner

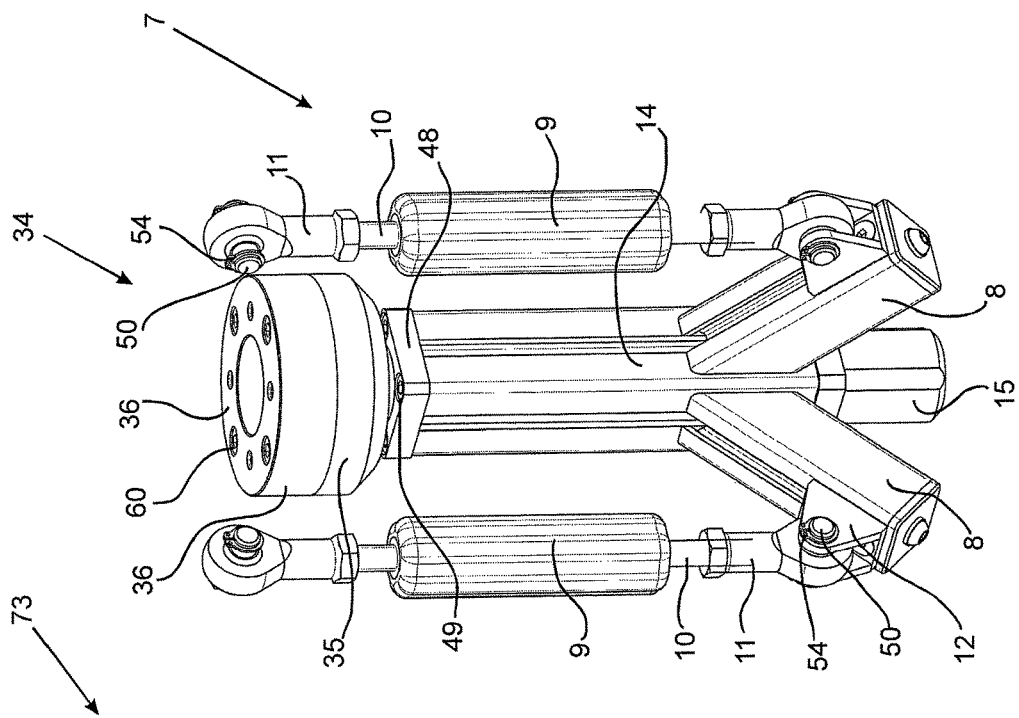
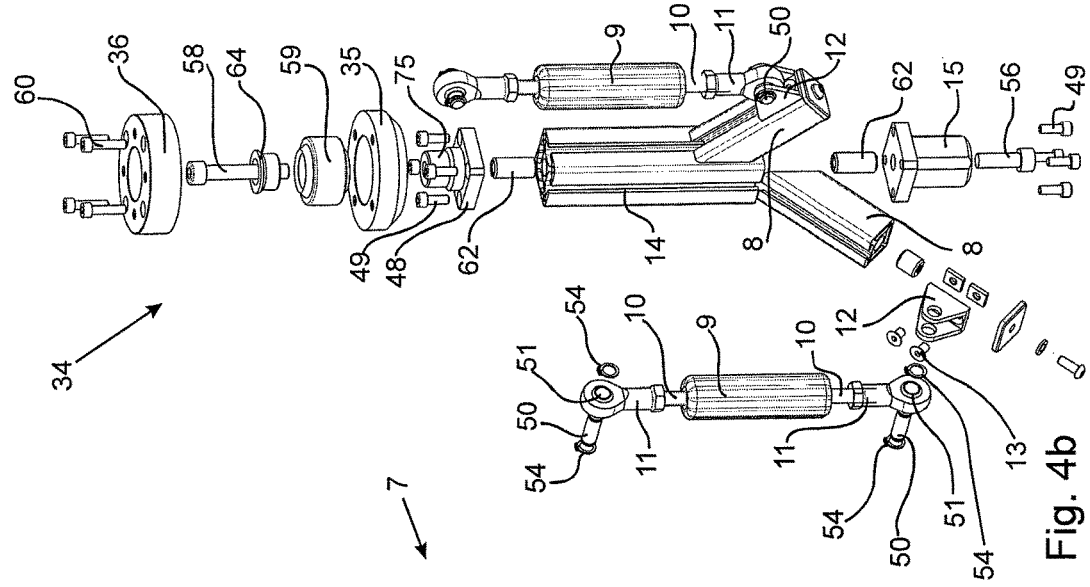
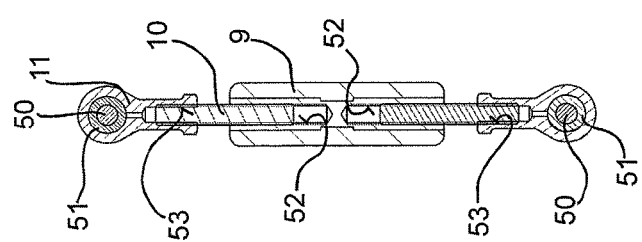
Fig. 4c
Fig. 4b
Fig. 4a

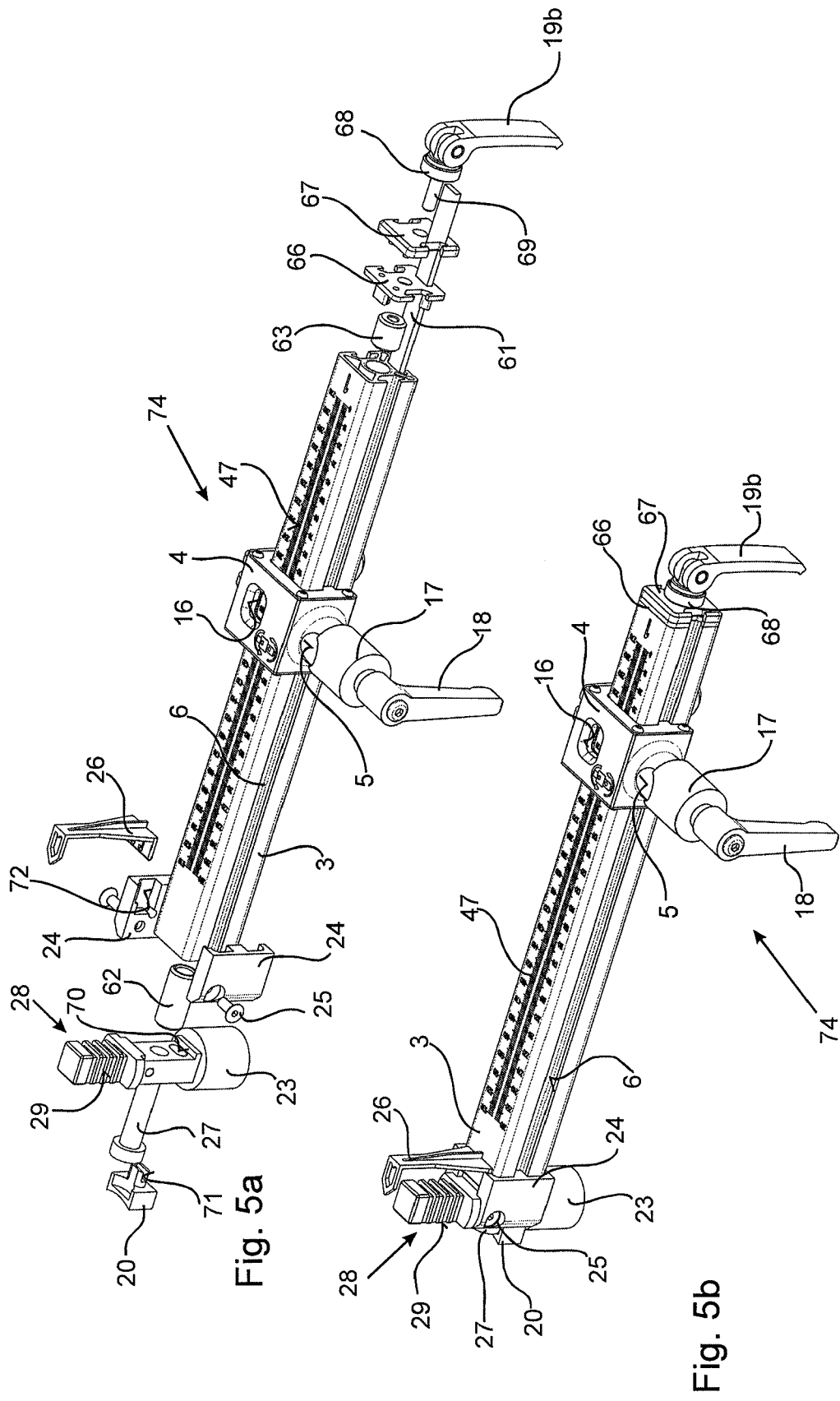

LIFTING DEVICE FOR AN ASSEMBLY OF A MOTOR VEHICLE

BACKGROUND OF THE INVENTION

Field of the Invention

The invention relates to a lifting device for an assembly of a motor vehicle comprising:
 a load carrying unit having at least one support arm, and
 a coupling unit arranged on the support arm for releasably connecting the support arm to the assembly of a motor vehicle.

Description of Related Art

Lifting devices of the initially-cited type are used in particular in vehicle workshops in order to remove motor vehicle assemblies such as vehicle transmissions or drive aggregates such as motor vehicle engines. To connect to preferably movable hoist units in vehicle workshops, the lifting devices can have a support unit arrangeable on these hoist units so that the lifting device, for example after the vehicle is lifted with a lifting platform, can be positioned below the motor vehicle assembly. Before the motor vehicle assembly is removed, the lifting device must be aligned with this assembly, such as a transmission, so that the load carrying unit of the lifting device abuts bearing points of the motor vehicle assembly to be removed that are provided for this purpose, by means of the coupling unit aligned on a support arm. Then the motor vehicle assembly, such as the transmission, can be disconnected from the vehicle and easily removed from the vehicle using the load carrying lifting device.

Known lifting devices of the initially-cited type have the disadvantage that they do not allow any, or only slight, adaptability to different motor vehicle assemblies and are therefore only useful for a limited number of different motor vehicle assemblies. A lifting device provided only for removing transmissions possesses only slight adaptability, and therefore even in authorized workshops which are set up for only one vehicle manufacturer, a number of lifting devices must be kept in order to carry out the removal of different assemblies from different types of vehicles.

BRIEF SUMMARY OF THE INVENTION

The object of the invention is to provide a lifting device of the initially-cited type, in particular an engine hoist and/or a transmission hoist for removing and installing engines and/or transmissions that can be used to remove a wide range of assemblies, at least different engines and/or transmissions of different types of vehicles, wherein adaptation to the assemblies is easily performable.

The invention solves the problem by a lifting device having the features of claim 1. Advantageous developments of the invention are specified in the dependent claims.

It is characteristic of the lifting device according to the invention, which can be used in particular as a transmission hoist and/or engine hoist, that the coupling unit is mounted on the support arm in a longitudinally movable manner, and the load carrying unit is designed to be connected to a crane unit, and in particular has a crane hook holder, and/or is adjustably connected to a support unit arrangeable on a hoist unit.

The lifting device according to the invention is divided into a plurality of assemblies, wherein the support unit can be alternatively or additionally available to form the load carrying unit for connecting to a crane unit. The crane unit makes it possible to lift a motor vehicle assembly arranged on the lifting device out of the motor vehicle, whereas the support unit serves to connect the lifting device to a conventional hoist unit such as a jack as is normally available in motor vehicle workshops, and thereby renders the use of an independent hoist unit for the lifting device superfluous. Lifting and lowering movements can be executed using the hoist unit.

The load carrying unit having at least one support arm is connected to the support unit such that it can be adjusted relative to support unit and hence relative to a hoist unit connected to the lifting device. The adjustability makes it possible to adjust the load carrying unit having one or more support arms into different positions relative to the support unit, or respectively a hoist unit connected to the support unit, so that the load carrying unit can be used for supporting and removing a plurality of different motor vehicle assemblies.

A coupling unit mounted on the support arm in a longitudinally movable manner and against which the motor vehicle assembly is braced or on which it hangs, serves to connect the load carrying unit to the motor vehicle assembly, e.g. a motor vehicle transmission or vehicle engine, both in the event that the lifting device is used with a hoist unit as well as with a crane unit.

Together with the mobility of the coupling unit that, for example, is designed to receive bolts connectable to the transmission, or to receive eyebolts connectable to an engine unit, the adjustability of the support arm relative to the support unit makes it possible to optimally adapt the lifting device to the motor vehicle assembly to be removed. Giving the design of the lifting device according to the invention, the load carrying unit can be moved into any position relative to the hoist unit, or respectively the support unit and/or crane unit, so that different motor vehicle assemblies, or respectively transmissions from different series and types of motor vehicles can be supported using the lifting device according to the invention and then removed. The use of the lifting device according to the invention makes it possible to dispense with other assembly-specific lifting devices, and therefore motor vehicle workshops equipped with the lifting device according to the invention can dispense with additional lifting devices for removing other assemblies which take up a significant amount of storage space. Furthermore, the use of the lifting device according to the invention makes it possible for only one person to remove and install a motor vehicle assembly, in particular a transmission.

The adjustability of the load carrying unit relative to the support unit, and hence the adjustability of the load carrying unit relative to a hoist unit connected to the support unit, can in principle be designed in any manner. However, one particularly advantageous design of the invention envisions designing the load carrying unit to be connected to the support unit so as to be tiltable relative to a longitudinal axis of the support unit, and/or designing the support arm to be pivotable about a longitudinal axis of the load carrying unit.

According to this embodiment of the invention, it is possible to tilt the load carrying unit relative to the support unit. The tilting is carried out in that a plane of the load carrying unit extending through one or more support arms can be tilted relative to a longitudinal axis of the support unit that normally also corresponds to the longitudinal axis of the hoist unit when the lifting device is installed on the hoist unit. This makes it possible to adapt, in a particularly advantageous manner, the support arm(s) with their coupling units both to the installation position of the motor vehicle assembly, or respectively the transmission, to be removed, as well as to the alignment of the employed hoist unit so that particularly reliable adaptation and support of the motor vehicle assembly can occur.

Furthermore, this further embodiment of the invention alternatively or additionally envisions designing the support arm to be pivotable about a longitudinal axis of the load carrying unit. In addition to a high variability of the lifting device, the pivotability of the support arm, or other support arms, about the longitudinal axis of the load carrying unit that normally coincides with the longitudinal axis of the support unit, or is flush with the load carrying point of a crane unit, also ensures that the forces acting on the load carrying unit are reliably borne by the crane unit, or can be transmitted to the support unit and hence to the hoist unit connectable to the support unit. Given the pivotability of the support arm(s) about the longitudinal axis of the load carrying unit, the coupling unit arranged on the support arm(s) can be arranged at any point on a surface defined by the swivelability and length of the support arms. The additional tiltability of this surface makes it possible to optimally adapt to a plurality of motor vehicle assemblies and their installation situation in the motor vehicle.

The design of the preferable tiltability of the load carrying unit relative to the longitudinal axis of the support unit can in principle be designed in any manner. However, one particularly advantageous design of the invention envisions connecting the support unit by means of a radial joint bearing unit to the load carrying unit, wherein in a particularly preferable manner, the radial joint bearing unit has a radial joint bearing with an inner ring connected to the support unit and an outer ring connected to the load carrying unit.

The use of a radial joint bearing unit constitutes a particularly easy and reliable option for designing the load carrying unit to be tiltable relative to the support unit. In one particularly simple design of the invention, it is envisioned, according to a development, to connect a radial joint bearing to an inner ring connected to the support unit, and to connect an outer ring connected to the load carrying unit to the radial joint bearing unit. The design of the radial joint bearing unit according to this development of the invention makes it possible to produce a particularly compact, tiltable connection between the support unit and load carrying unit. Furthermore, the radial joint bearing unit makes it possible to reliably transmit all of the forces acting on the load carrying unit to the support unit, as well as to a hoist unit connectable to the support unit.

The design of the tilt adjustment, as well as a lock of the set tilt, is in principle freely selectable. However, one particularly advantageous embodiment of the invention envisions connecting one, preferably two, length-changeable tilt adjusters, arranged offset 90° from each other about the longitudinal axis of the support unit, to the load carrying unit at one end, and to the support unit at the other end.

The use of such tilt adjusters is distinguished in that the tilt angle of the load carrying unit relative to the support unit can be set particularly easily and comfortably, given the adjustability of the length of the tilt adjuster. Given the connection of the tilt adjuster to the load carrying unit and the support unit, setting the length of the tilt adjuster causes an angle of the load carrying unit relative to the support unit to be set, and hence a plane that extends through one or more support arms.

The use of a second tilt adjuster arranged offset by 90° from the first tilt adjuster makes it possible to set a second angle offset by 90° of the load carrying unit, or respectively the angle of the extended plane so that, by means of the two angle adjusters arranged offset by 90° from each other, a plane extending through one or more support arms can be tilted depending on the longitudinal adjustability of the tilt adjusters in any direction about the longitudinal axis of the support unit in the manner of a tumbling motion.

The longitudinal adjustability of the tilt adjusters can be variously designed. One possible design is to use a handle having inner threads running in the same direction, wherein the inner thread always accommodates a connecting means which is connected to the load carrying unit, or respectively support unit, such that rotating the handle causes the spacing of the connecting means to change. Given a self-inhibiting design of the thread, a separate locking means can be discarded.

In principle, the load-carrying unit can be designed to be adjustable relative to the support unit in any manner, wherein a radial joint bearing unit is preferably provided for setting the tilt of the load carrying unit relative to a longitudinal axis of the support unit. One particularly advantageous design of the invention furthermore envisions the load carrying unit having a guide unit connected to the radial joint bearing unit which is designed to pivotably bear the support arm about the longitudinal axis of the guide unit.

According to this embodiment of the invention, the load carrying unit has a guide unit on which one or more support arms are pivotably arranged about the longitudinal axis of the guide unit. The pivotability of the support arm or arms ensures that the lifting device is easily and optimally adaptable to the motor vehicle assembly to be received, in particular to a motor vehicle transmission to be removed. For connecting to the motor vehicle assemblies, one or more coupling units can be arranged on the support arms which in turn are designed to receive specific connecting means such as suitable bolts or eyebolts which are adapted to the support, or respectively lifting points, or respectively bolt seats of the motor vehicle assembly to be received. The design of the load carrying unit with a guide unit and support arms that are pivotable relative to the guide unit furthermore allows a particularly compact production of the lifting device.

For the swivelable bearing of the support arms, according to a further embodiment of the invention it is provided that the guide unit comprises a link for adjustably bearing a bearing body connected to the support arm. The use of a link as well as a bearing body adapted to the link ensures a particularly reliable connection of the support arm to the guide unit, and hence particularly reliable support of the support arms on the guide unit, and hence an effective transmission of the forces acting on the support arms to the support unit or crane unit connected to the guide unit. Furthermore, this embodiment of the invention can ensure that a set position of the support arm or support arms is retained so that there is a particularly easy way of removing the motor vehicle assembly.

The design of the bearing body which connects the support arm to the guide unit, and which is preferably fixedly connected to the support arm, is in principle freely selectable. However, one particularly advantageous design of the invention envisions the bearing body extending in the direction of the longitudinal axis of the guide unit, and one end being pivotably mounted on the guide unit by means of a ball bearing along an annular guide path running coaxial to a guide bolt of the guide unit, and the other end being pivotably mounted on the guide unit by means of a bearing ring arranged on the bearing body, wherein the bearing ring is pivotably arranged on the guide bolt.

According to this embodiment of the invention, the longitudinal axis of the bearing body extends parallel to the longitudinal axis of the guide unit. Accordingly, the support arm runs perpendicular to the longitudinal axis of the guide unit and to the bearing body. With a spherical body arranged on the bottom end of the bearing body with reference to the operating position, the bearing body abuts the annular guide path of the guide unit. The connection of the bearing body via a spherical body in the guide path ensures particularly easy and reliable adjustability of the support arm relative to the guide unit. To secure the position of the bearing body relative to the guide unit, the bearing body in the area of its top end opposite the spherical body with respect to the operating position has a bearing ring that extends perpendicularly toward the guide bolt and coaxially surrounds the guide bolt in the operating position so that the overall bearing body is pivotable about the longitudinal axis of the guide unit, or respectively the guide bolt, but however cannot be tilted relative thereto, to therefore ensure a particularly effective transmission of force with a simultaneously very secure position of the support arm.

The number of support arms of the load carrying unit is in principle freely selectable and can be determined correspondingly to the intended use. However, according to a particularly advantageous embodiment of the invention it is provided that two, preferably three, particularly preferably four, support arms are pivotably mounted on the guide unit about a longitudinal axis of the guide bolt. The arrangement is such that the guide bolts are arranged distributed around the guide bolt on a common, coaxial circular path such that they can be pivoted about the guide bolt. The bearing rings of the individual support arms are arranged in different grooves in a locking section of the bearing body such that the bearing rings, viewed in the direction of the longitudinal axis of the guide bolt, are mounted to overlay in a guide section of the guide bolt.

According to this embodiment of the invention, it is provided that the individual bearing rings of the individual support arms each run in different planes perpendicular to the longitudinal axis of the guide bolt so that the guide unit can be designed in a particularly compact manner. Each support arm is accordingly guided on the guide unit at one end by a spherical body and at the other end by a bearing ring, wherein the individual bearing rings of the respective support arms viewed in the direction of the longitudinal axis are arranged at a distance from each other on the guide section. In a particularly advantageous manner, an intermediate ring can be arranged between the individual bearing rings to ensure effective adjustability.

According to another embodiment of the invention, the support arm has a brake body which is adjustable between a released position and a locked position. The use of such an adjustable brake body makes it possible on the one hand to easily adjust the support arm relative to the guide bolt when the brake body is in the released position. After setting the desired position, the support arm can on the other hand then be reliably fixed in the locked position using the brake body so that, after setting the position of the support arms of the load carrying unit depending on the motor vehicle assembly to be removed, the lifting device reliably remains in a correspondingly adapted position.

The mode of engaging the brake body in the locked position is in principle freely selectable. Accordingly, the brake body can for example be designed so that it produces a form-fit connection with the guide bolt or other components of the guide unit when in locked position. However, according to a particularly advantageous embodiment of the invention it is provided that the brake body is adjustable by means of a locking clip in the direction toward the guide bolt and friction locks the support arm with the guide bolt when in the locked position.

According to this further embodiment of the invention, the brake body is adjusted by a locking clip which is adjustable between a position corresponding to the released position and the locked position of the brake body. In the locked position, the lock clip causes the brake body to friction lock with a surface of the guide bolt so that the guide bolt then reliably remains in the set position. The use of a friction lock is distinguished in that it enables the support arm to be fixed in any angular position independent of locking marks. At the same time, the use of the locking clip enables a quick and easy change between the released position and the locked position so that the lifting device can be easily and quickly adapted to a motor vehicle assembly to be removed.

The setting of the lifting device, i.e., the alignment of the support arm or the support arms on the guide unit as well as any provided tilt of the seat unit relative to the support device in the event of use with a hoist unit, occurs in principle with reference to the motor vehicle assembly to be removed, wherein conventional bearing points are provided thereupon, by means of which the motor vehicle assembly can be supported, or respectively lifted. The support arms can for example be set merely in a visual alignment by the user, and this must be done directly using the motor vehicle assembly to be removed, normally within a restricted working environment. However, according to a particularly advantageous embodiment of the invention it is provided that an angular scale is arranged on the guide unit, and an indicator element alignable with the angular scale is arranged on the support arm.

According to this embodiment of the invention, the support arm can be easily fixed in a predetermined position using an indicator element and the angular scale arranged on the guide unit. When data are available specific to the motor vehicle assembly, it is therefore possible to perform an alignment of the support arms independent of the vehicle so that the lifting device can then be immediately arranged without further adaptations in the set position on the motor vehicle assembly to be removed, and can be connected thereto. Ideally, there are specific data for each motor vehicle assembly that permit in advance a corresponding adjustability of the support arms using the indicator element and the angular scale.

Furthermore, it is particularly preferable for the support arm to have a length scale, and the coupling unit to have an indicator element for aligning the coupling unit on the support arm. Analogous to aligning the support arm on the angular scale, the use of a length scale and an indicator unit arranged on the coupling unit allows the longitudinal alignment of the coupling unit on the support arm so that, when corresponding data are available, the support arms as well as the coupling units can be set independent of involved experiments with the motor vehicle component to be removed. Ideally, angle information is available for the support arms and length information is available for the coupling units for all motor vehicle assemblies so that a user is offered a particularly comfortable way of adapting the lifting device in advance to any assembly to be removed, and then using the lifting device without readjustment.

According to a particularly advantageous embodiment of the invention, the support arms have identifications which differ from each other, in particular colourings that deviate from each other, for example when a plurality of support arms are used. A deviating colouration which can be used alternately or in addition to, for example, a numbering to be carried out, or any other different identifications of the support arms, for example with letters, makes it possible to adapt the load carrying unit in a particularly comfortable manner when the information on the motor vehicle assemblies is used in a prepared form. Accordingly for example when colourations that differ from each other are used for the support arms, coloured tables based on the information of the motor vehicle assemblies can be provided which display an angular position associated with the respective colours, as well as a length position of the coupling units of the respective support arms. This embodiment of the invention is advantageous in particular in a workshop, since it is very user friendly and prevents incorrect settings in a particularly easy manner. When for example four support arms are used, each of them has a different colour. An information card specific to the motor vehicle assembly has an angular position and a length position for each colour so that the load carrying unit can be quickly and effectively adapted to the respective motor vehicle assembly.

According to a further advantageous embodiment of the invention, the coupling unit which serves to connect to the motor vehicle assembly has a seat opening arranged on the side of the support arm to receive a coupling adapter, wherein the coupling adapter can be clamped in the seat opening or screwed into the seat opening. The seat opening makes it possible to receive the adapter adapted to the respective motor vehicle assembly which enables optimum support or a suspended seat for the respective motor vehicle assembly. The coupling adapters, or respectively step bolts or eyebolts, can be clamped into the seat opening, or respectively screwed into it, to ensure an effective securing of the position of the coupling adapters. In addition, the lateral arrangement of the seat opening in the coupling unit enables a particularly flat construction and, additionally, a high variability of the lifting device in the event that the coupling unit provided according to an advantageous embodiment of the invention is designed such that the coupling unit is borne on the support arm in a longitudinally movable manner, both with a seat opening arranged on one side of the support arm, and a seat opening arranged on the other side of the support arm.

The arrangement of the coupling unit on the one side and on the other side is understood to mean the possibility of being able to rotate the coupling unit, i.e. pull it off of the support arm and use it so that, depending on the shoved-on direction, the seat opening can be arranged both on the left as well as on the right side of the support arm with reference to the position of operation. This contributes to the variability of the lifting device since the swinging range of the support arms, in particular two neighboring support arms, also depends on whether the seat openings in the coupling units are facing away from each other or towards each other. The alignment of the coupling units can also be dictated by suitable information tables so that the user is provided with an easy adaptability of the lifting device. In conjunction with an arrangement of the indicator element on the coupling unit that is eccentric relative to the support arm, the possibility of turning the coupling unit furthermore makes it feasible to arrange a double scale on the support arm, i.e., two length scales arranged next to each other.

To secure the coupling unit in the set position, the coupling unit has a locking means, in particular a locking clip, according to a particularly advantageous embodiment of the invention to reliably prevent shifting and a malfunction. The locking clip clamps the coupling unit against the support arm.

BRIEF DESCRIPTION OF THE SEVERAL VIEWS OF THE DRAWING(S)

Figure 2:
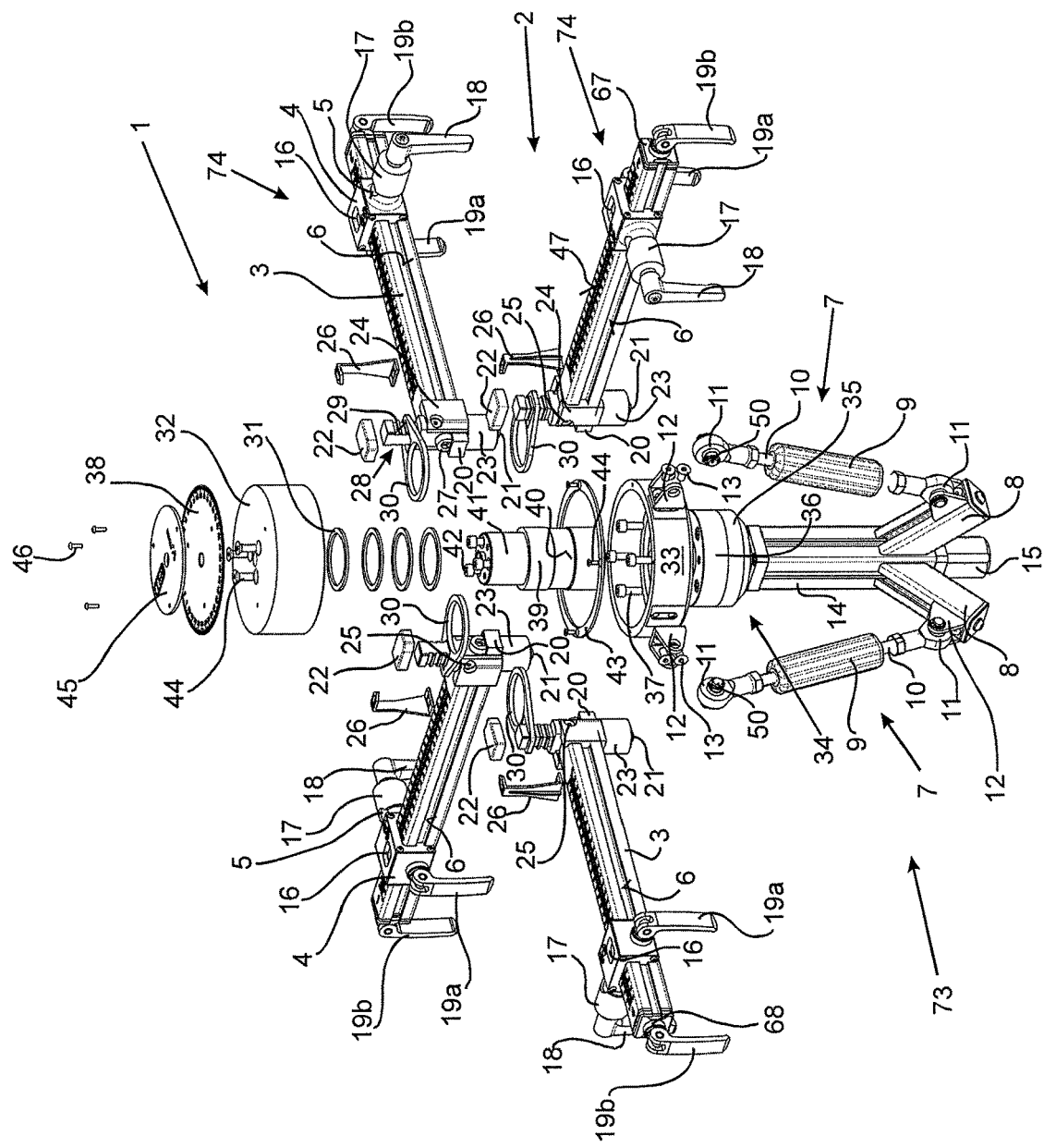
Figure 3:
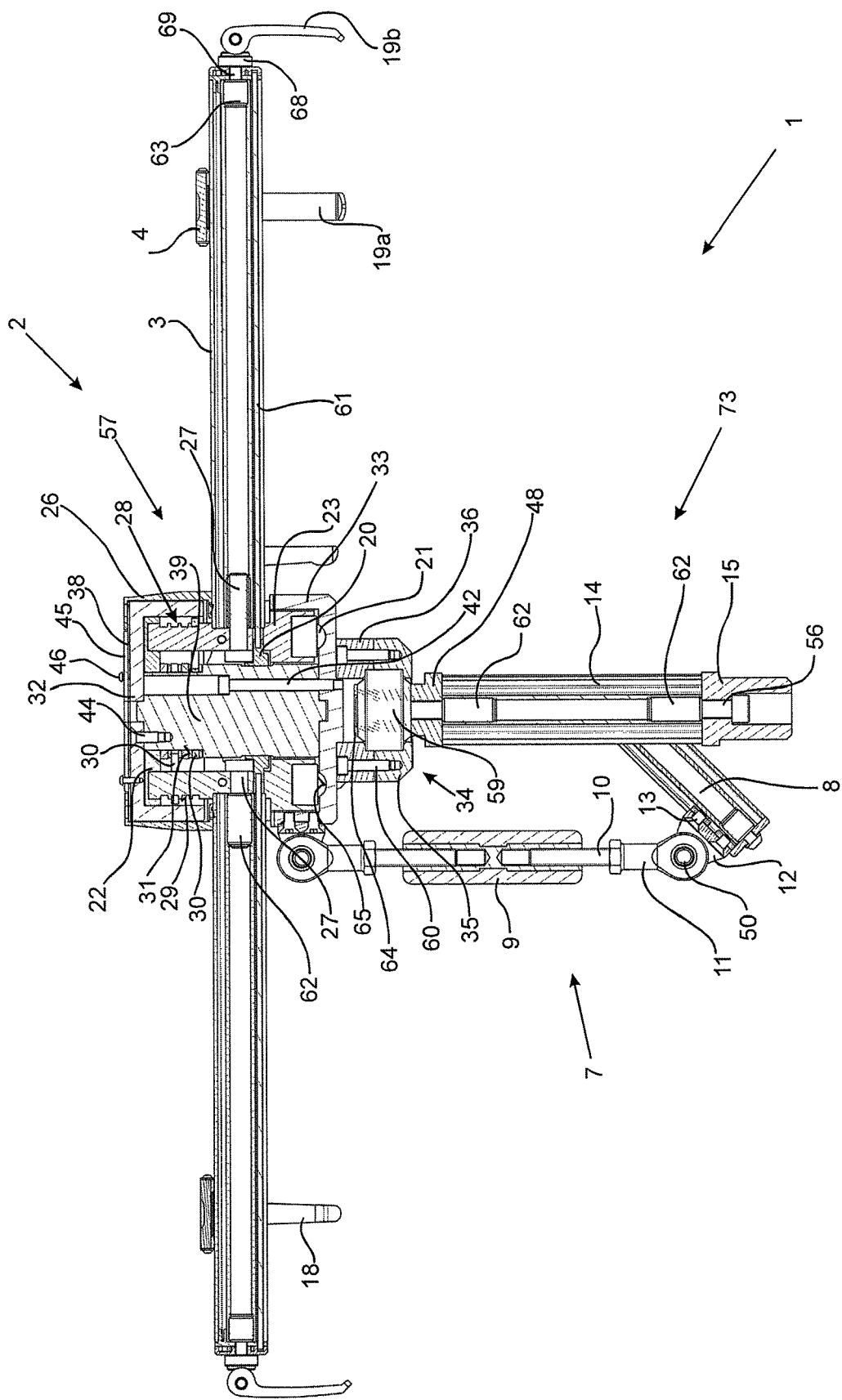
Figure 6:
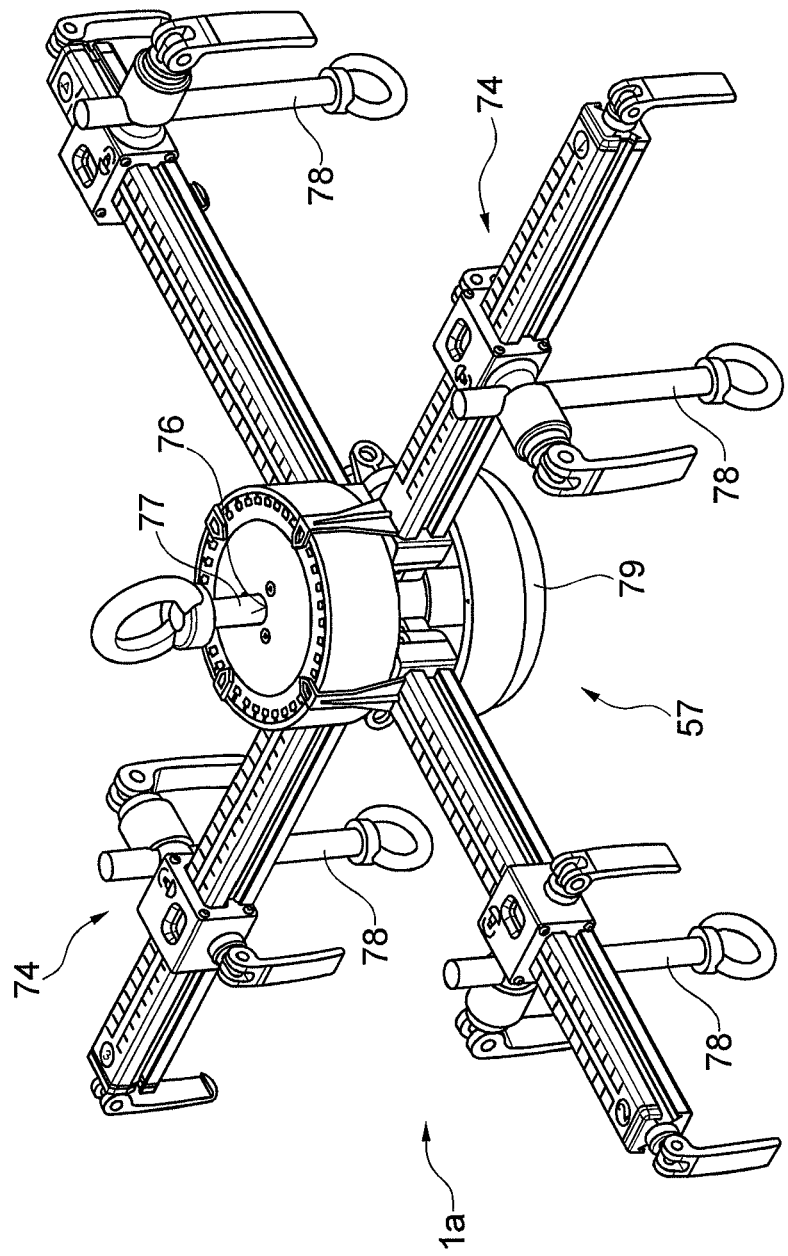

An embodiment of the invention is explained below with reference to the drawings. The drawings show the following:

FIG. 1 a perspective view of a lifting device with a load carrying unit having four support arms;

FIG. 2 an exploded view of the lifting device from FIG. 1;

FIG. 3 a view of a section of the lifting device from FIG. 1;

FIG. 4a a sectional view of a tilt adjuster of the lifting device from FIG. 1;

FIG. 4b an exploded view of a support device with a radial joint bearing unit arranged thereupon in an exploded view;

FIG. 4c a perspective view of the support unit with the radial joint bearing unit arranged thereupon;

FIG. 5a an exploded view of a support arm with the bearing body arranged thereupon;

FIG. 5b a perspective view of the support arm from FIG. 5a with the bearing body arranged that thereupon, and FIG. 6 a second embodiment of the lifting device.

DETAILED DESCRIPTION OF THE INVENTION

FIG. 1 shows a lifting device 1 that can be used in a motor vehicle workshop as a transmission hoist for removing a transmission unit (not shown) of a motor vehicle. For connecting to a transmission unit, the lifting device 1 has a load carrying unit 2 which has four support arms 3 in the depicted exemplary embodiment. The support arms 3 are arranged in a guide unit 57 of the load carrying unit 2 to pivot about a guide bolt 39 of the guide unit 57. For its part, the guide unit 57 is tiltably connected to a support unit 73 via a radial joint bearing unit 34 by means of which the lifting device 1 is connectable to a hoist unit (not shown) (see FIG. 2-5a).

The pivotable arrangement of the support arms 3 on the guide unit 57 makes it possible to move the support arms 3 relative to each other into a required position corresponding to the transmission unit to be removed. To movably mount the support arms 3 on the guide unit 57, the ends of the support arms 3 facing the guide bolt 39 are connected to a bearing body 23 which is adjustably arranged in the guide unit 57. The bearing body 23 is connected to the support arms 3 by a fastening screw 27 that can be screwed into a threaded sleeve 62 inserted in the support arm 3 at the end of the support arm 3 facing the guide bolt 39. The position of the bearing body 23 on the support arm 3 is additionally secured by two retaining shells 24 arranged on the side of the support arm 3, the fastening screw 25 of which extends through a through-hole in the bearing body 23. The retaining shells 24 furthermore have a recess 72 to accommodate an indicator element 26 which is immovably connected to the support arm 3 between the retaining shells 24.

The bottom side of the bearing body 23, with reference to the position of installation and operation, has a spherical body 21 which is borne in a guide path 65 running coaxial to the guide bolt 39 in a main housing body 38 of the guide unit 57. On its end opposite the spherical body 21, the bearing body 23 has a locking section 28 having a plurality of grooves 29. The grooves 29 serve to receive a bearing ring 30 wherein, viewed in the direction of the longitudinal axis of the bearing body 23, the bearing rings 30 of the four employed bearing arms 3 are arranged in overlaid grooves 29 which deviate from each other. Viewed in direction of the longitudinal axis of the guide bolt 39, the overlaid arrangement of the bearing rings 30 consequently allows their overlaid coaxial arrangement in a guide section 41 of the guide bolt 39. The intermediate rings 31 arranged in the direction of the longitudinal axis between the bearing rings 30 ensure friction-free adjustment of the bearing arms 3 on the guide unit 57, wherein the support arms 3 are supported in each settable position by a bearing ring 43 which abuts a bottom side of the support arms 3 and is fastened to a peripheral bar of the main housing body 33 of the guide unit 57. The support arms 3 are furthermore guided on an inside of a housing cover 32 of the guide unit 57 by bearing caps 22 which are placed on the end of the locking section 28 opposite the spherical body 21.

The housing cover 32 which forms a slot-shaped link for the support arms 3 by its arrangement at a distance from the main housing body 33 is immovably screwed to the bearing bolt 39 by fastening screws 44. Furthermore, the top side of the housing cover 32 has an angular scale 38 as well as an indicator plate 45 which are jointly fastened by retaining pins 46 to the housing cover 32. The indicator element 26 abuts the angular scale 38 so that the support arms 3 which differ in colour can be set via the indicator element 26 in a predetermined position.

To lock the support arms 3 in the set position, they also have a brake body 20 which is slidably fastened to the bearing body 23 of the support arm 3. The brake body 20 is adjustable between a released position and a locked position by a locking clip 19b arranged on the end of the bearing arm 3 opposite the bearing body 23. In the locked position, the brake body 20 lies against a groove 40 of the guide bolt 39 in a friction lock. The locking bolt 19b can be adjusted between a position associated with the locked position and released position. In the locked position, a contact ring 68 arranged on the locking clip 19b exerts pressure via a pressure body 67 upon a pushrod 61 toward the guide bolt 39 so that the brake body 20 connected via a seat section 71 to the pushrod 61 is pressed against the groove 40 in a corresponding manner.

To bear the locking clip 19b on the support arm 3, a pin seat 63 for receiving a pin 69 of the locking clip is inserted in the support arm 3 in the end opposite the bearing body 23 where it is secured by a fastening body 66. Depending on the position of the locking clip 19b, the locking clip moves the pressure body 67 connected to the pushrod 61 toward the guide bolt 39. and thereby causes the support arms 3 to lock in a set position.

In addition to the indicator plate 45 which for example displays a bird's-eye view of a vehicle and thereby easily enables an alignment of the set lifting device 1 relative to the vehicle so that an optimal adaptation to the load carrying points of the transmission to be removed exists, the support arms 3 have two length scales 47 arranged next to each other which enable the alignment of a coupling unit 74 mounted in a longitudinally movable manner on the support arms 3. The coupling units 74 in this case have a sleeve 4 that is adapted to the cross-section of the support arms 3 and has an opening 16 that is arranged eccentric to the support arm 3 in the coupling unit 74 and which enables a precise alignment of the sleeve 4 with one of the two length scales 47 depending on their push-on direction on the support arm 3, wherein the opening 16 in this case can also be provided with an indicator. The sleeves 4 guided in a groove 6 of the support arms 3 are fixed in a set position by a locking clip 19a which clamps the sleeve 4 against the support arm 3.

For connecting the coupling unit 74 to a transmission to be removed, the coupling unit 74 has a seat opening 5 arranged on the side that is designed to receive the coupling adapter (not shown), wherein one end of the coupling adapter is adapted to the seat opening 5, and the other end is adapted to the contact points on the transmission. A clamping element 17 serves to fix the coupling adapter in the seat opening 5 and can be moved by a clamping lever 18 toward the coupling adapter so that it is immovably secured in the seat opening 5.

The guide bolt 39 is immovably connected by fastening screws 42 to the main housing body 33 of the guide unit 57, and the main housing body 33 is in turn connected via fastening screws 37 to a radial joint bearing unit 34 which for its part is connected to the support unit 73. To connect the guide unit 57 to the radial joint bearing unit 34, the main housing body 33 of the guide unit 57 is screwed to an upper shell 36 of the radial joint bearing unit 34 by the fastening screws 37. The upper shell 36 and lower shell 35 are fixed to each other by fastening screws 60. A radial joint bearing 59 is arranged in the housing of the radial joint bearing unit 34 formed between the upper shell 36 and lower shell 35. An outer ring of the radial joint bearing 59 is fixed between the upper shell 36 and lower shell 35. An inner ring of the radial joint bearing 59 is fastened by a fastening screw 58 to a bearing section 75 of a bearing seat 48 of the support unit 73. A lock ring 64 arranged on the bearing locking screw 78 secures the position of the inner ring on the bearing seat section 75 in an axial direction. The radial joint bearing unit 34 as well as the load carrying unit 2 connected to the radial joint bearing unit 34 can accordingly be tilted relative to a longitudinal axis of the support unit 73.

The support unit 73 has a central support rod 14 to which the bearing seat 48 is fixed by fastening screws 49 as well as by the bearing locking screw 58 screwed into a thread sleeve 62. On the end opposite the bearing seat 48, the support unit 73 has a coupling body 15. This is attached to the support rod 14 via a fastening screw 56 which is screwed into a threaded sleeve 62 inserted in the support rod 14, as well as via fastening screws 49 screwed into the support rod 14. By means of the coupling body 15, it is possible to arrange the lifting device 1 on a lifting device normally available in motor vehicle workshops.

To set a tilt of the load carrying unit 2 via the radial joint bearing unit 34, the support unit 72 has two tilt adjusters 7 arranged offset by 90°. On one end, the tilt adjusters 7 are articulated to holders 12 which are arranged on cantilevers 8 of the support rod 14. For this a bolt 50 extends through a bearing bush 51 of a bolt seat 11 of the tilt adjuster 7. The position of the tilt adjuster 7 is secured in the holder 12 by locking rings 54 gripping the bolt 50.

Analogously, the tilt adjusters 7 are affixed on the holders 12 arranged on the main housing body 33. The holders 12 are affixed on the cantilever 8 and the housing body 33 by fastening screws 13.

Threaded rods 10 are screwed into an inner thread 53 in the opposing bolt seats 11 of the tilt adjusters 7. The ends of the threaded rods 10 opposite the bolt seats 11 are screwed into an inner thread 52 of a handle 9. Rotating the handle 9 accordingly causes a change in length of the tilt adjuster 7 and thereby tilts the load carrying unit 2 relative to a longitudinal axis extending through the longitudinal axis of the support rod 14. By means of the two tilt adjusters 7 offset by 90° relative to each other and arranged around the support rod 14, a plane extending through the support arms 3 of the load carrying unit 2 can accordingly be tilted in any direction relative to the longitudinal axis of the support rod 14.

FIG. 6 shows an embodiment of the lifting device 1 a as an engine hoist without a support device 73 and a radial joint bearing unit 34 which only differs above and beyond the lifting device 1 shown in FIG. 1 to FIG. 5b in that said lifting device has a centrally arranged threaded hole 76 running in the longitudinal direction to form a crane hook holder in the central guide bolt 39 of the guide unit 57. Otherwise, the structure of the guide unit 57 corresponds with the guide unit 57 of the lifting device 1. The threaded hole 76 serves to receive an eyebolt 77 extending through openings in the housing cover 32, the angular scale 38 and indicator 45, by means of which the lifting device 1a can be coupled to a crane unit (not shown).

To connect the lifting device 1a to a vehicle assembly to be lifted, in particular a motor vehicle engine (not shown), eyebolts 78 forming coupling adapters, and from which the motor vehicle engine can be suspended, are clamped in the seat openings 5 in the coupling units 74. To protect the bottom side of the guide unit 57 connectable to the radial joint bearing unit 34, the guide unit is provided with a protective cover 79.

LIST OF REFERENCE SYMBOLS

1 Lifting device
2 Load carrying unit
3 Support arm
4 Sleeve
5 Seat opening
6 Groove
7 Tilt adjuster
8 Cantilever
9 Handle
10 Threaded rod
11 Bolt seat
12 Holder
13 Fastening screw
14 Support rod
15 Coupling body
16 Indicator element/opening
17 Clamping element
18 Clamping lever
19a Locking clip
19b Locking clip
20 Brake body
21 Spherical body
22 Bearing cap
23 Bearing body
24 Retaining shell
25 Fastening screw
26 Indicator element
27 Fastening screw
28 Locking section
29 Groove
30 Bearing ring
31 Intermediate ring
32 Housing cover
33 Main housing body
34 Radial joint bearing unit
35 Bottom shell
36 Upper shell
37 Fastening screw
38 Angular scale
39 Guide bolt
40 Groove
41 Guide section
42 Fastening screw
43 Bearing ring
44 Fastening screw
45 Indicator
46 Retaining pin
47 Length scale
48 Bearing seat
49 Fastening screws
50 Bolt
51 Bearing bush
52 Inner thread
53 Inner thread
54 Locking ring
55 Fastening screw
56 Fastening screw
57 Guide unit
58 Bearing locking screw
59 Radial joint bearing
60 Fastening screws
61 Pushrod
62 Threaded sleeve
63 Pin seat
64 Locking ring
65 Guide path
66 Locking body
67 Pressure body
68 Contact ring
69 Pin
70 Opening (pushrod)
71 Seat section
72 Recess (retaining shell)
73 Support unit
74 Coupling unit
75 Bearing seat section
76 Crane hook seat
77 Eyebolt
78 Eyebolt
79 Protective cover

I claim:

1. A lifting device for an assembly of a motor vehicle, comprising:
a load carrying unit having at least one support arm, and
a coupling unit arranged on the at least one support arm for releasably connecting the at least one support arm to the assembly of a motor vehicle, wherein the coupling unit is mounted on the at least one support arm in a longitudinally movable manner, and the load carrying unit
is designed for connection to a crane unit and has a crane hook seat, and/or
is adjustably connectable to a support unit arrangable on a hoist unit, wherein the load carrying unit is tiltably connected to the support unit relative to a longitudinal axis of the support unit; and the lifting device further comprises one or more length-changeable tilt adjusters that are arranged offset 90° from each other about the longitudinal axis of the support unit, wherein the one or more length-changeable tilt adjusters are connected to the load carrying unit at a first end and to the support unit at a second end.

2. The lifting device according to claim 1, wherein the support unit is connected by a radial joint bearing unit to the load carrying unit.

3. The lifting device according to claim 2, wherein the radial joint bearing unit has a radial joint bearing with an inner ring connected to the support unit and an outer ring connected to the load carrying unit.

4. The lifting device according to claim 2, wherein the load carrying unit has a guide unit connected to the radial joint bearing unit, wherein the guide unit is designed to pivotably bear the at least one support arm about the a longitudinal axis of the guide unit.

5. The lifting device according to claim 4, wherein the guide unit has a link for adjustably bearing a bearing body connected to the at least one support arm.

6. The lifting device according to claim 5, wherein the bearing body extends in the direction of the longitudinal axis of the guide unit, and one end of the bearing body is pivotably mounted by means of a spherical body along an annular guide path running coaxial to a guide bolt of the guide unit, and an opposing end of the bearing body is pivotably mounted on the guide unit by means of a bearing ring arranged on the bearing body, wherein the bearing ring is pivotably arranged on the guide bolt.

7. The lifting device according to claim 6, wherein two to four support arms are pivotably mounted on the guide unit about a longitudinal axis of the guide bolt, wherein the bearing rings of the individual support arms are arranged in different grooves in a locking section of the bearing body such that the bearing rings, in the direction of the longitudinal axis of the guide bolt, are mounted next to each other in a guide section of the guide bolt.

8. The lifting device according to claim 4, wherein an angular scale is arranged on the guide unit, and an indicator element alignable with the angular scale is arranged on the at least one support arm.

9. The lifting device according to claim 4, comprising an indicator for aligning the lifting device with the assembly of the motor vehicle, wherein the indicator is arranged on the guide unit.

10. The lifting device according to claim 1, wherein the at least one support arm has a brake body which is adjustable between a released position and a locked position.

11. The lifting device according to claim 10, wherein the load carrying unit has a guide unit having a guide bolt, wherein the guide unit is connected to the radial joint bearing unit which is designed to pivotably bear the at least one support arm about a longitudinal axis of the guide unit, and wherein the brake body is adjustable by means of a locking clip in the direction toward the guide bolt and friction locks the at least one support arm with the guide bolt when in the locked position.

12. The lifting device according to claim 1, wherein the at least one support arm has a length scale, and the coupling unit has an indicator element for aligning the coupling unit on the at least one support arm.

13. The lifting device according to claim 1, wherein the coupling unit has a seat opening arranged on the side of the support arm for receiving a coupling adapter, wherein the coupling adapter can be clamped in the seat opening, or can be screwed into the seat opening.

14. The lifting device according to claim 1, wherein the coupling unit is designed such that it is borne on the at least one support arm in a longitudinally movable manner, both with a seat opening arranged on one side of the at least one support arm, and a seat opening arranged on the other an opposing side of the at least one support arm.

15. The lifting device according to claim 1, wherein the coupling unit has a locking means for fixing the coupling unit on the at least one support arm.

16. The lifting device according to claim 1, wherein each of the at least one support arm has an identification which differs from the other support arms.

17. The lifting device according to claim 16, wherein the identification of each of the at least one support arm is a colouring.

18. A lifting device for an assembly of a motor vehicle, comprising:
a load carrying unit having at least one support arm, and
a coupling unit arranged on the at least one support arm for releasably connecting the at least one support arm to the assembly of a motor vehicle, wherein the coupling unit is mounted on the at least one support arm in a longitudinally movable manner, and the load carrying unit
is designed for connection to a crane unit and has a crane hook seat, and/or
is adjustably connectable to a support unit arrangable on a hoist unit;
wherein the load carrying unit is tiltably connected to the support unit relative to a longitudinal axis of the support unit, and the support unit is connected by a radial joint bearing unit to the load carrying unit, and the radial joint bearing unit has a radial joint bearing with an inner ring connected to the support unit and an outer ring connected to the load carrying unit.

19. A lifting device for an assembly of a motor vehicle, comprising:
a load carrying unit having at least one support arm, and
a coupling unit arranged on the at least one support arm for releasably connecting the at least one support arm to the assembly of a motor vehicle, wherein the coupling unit is mounted on the at least one support arm in a longitudinally movable manner, and the load carrying unit
is designed for connection to a crane unit and has a crane hook seat, and/or
is adjustably connectable to a support unit arrangable on a hoist unit;
wherein the load carrying unit is tiltably connected to the support unit relative to a longitudinal axis of the support unit, and the support unit is connected by a radial joint bearing unit to the load carrying unit,
wherein the load carrying unit has a guide unit connected to the radial joint bearing unit, wherein the guide unit is designed to pivotably bear the at least one support arm about a longitudinal axis of the guide unit, and the guide unit has a link for adjustably bearing a bearing body connected to the at least one support arm, and the bearing body extends in the direction of the longitudinal axis of the guide unit, and one end of the bearing body is pivotably mounted by means of a spherical body along an annular guide path running coaxial to a guide bolt of the guide unit, and an opposing end of the bearing body is pivotably mounted on the guide unit by means of a bearing ring arranged on the bearing body, wherein the bearing ring is pivotably arranged on the guide bolt.

* * * * *